United States Patent
Wang et al.

(10) Patent No.: US 11,924,116 B2
(45) Date of Patent: Mar. 5, 2024

(54) RESOURCE ADDRESS ALLOCATION METHOD, SYSTEM AND APPARATUS FOR PCI DEVICE

(71) Applicant: Shandong Yingxin Computer Technologies Co., Ltd., Jinan (CN)

(72) Inventors: Luxiang Wang, Jinan (CN); Fei Lu, Jinan (CN)

(73) Assignee: Shandong Yingxin Computer Technologies Co., Ltd., Shandong (CN)

(*) Notice: Subject to any disclaimer, the term of this patent is extended or adjusted under 35 U.S.C. 154(b) by 0 days.

(21) Appl. No.: 18/259,693

(22) PCT Filed: Jan. 28, 2022

(86) PCT No.: PCT/CN2022/074603
§ 371 (c)(1),
(2) Date: Jun. 28, 2023

(87) PCT Pub. No.: WO2022/188577
PCT Pub. Date: Sep. 15, 2022

(65) Prior Publication Data
US 2024/0039863 A1    Feb. 1, 2024

(30) Foreign Application Priority Data
Mar. 11, 2021 (CN) .......................... 202110265077.1

(51) Int. Cl.
*H04L 47/765* (2022.01)
*G06F 13/40* (2006.01)
(Continued)

(52) U.S. Cl.
CPC .......... *H04L 47/765* (2013.01); *H04L 47/781* (2013.01); *H04L 47/801* (2013.01); *G06F 13/40* (2013.01)

(58) Field of Classification Search
CPC ... H04L 47/765; H04L 47/781; H04L 47/801; G06F 13/40
See application file for complete search history.

(56) References Cited

U.S. PATENT DOCUMENTS

2006/0195675 A1    8/2006    Arndt et al.
2007/0088943 A1    4/2007    Phelps et al.
(Continued)

FOREIGN PATENT DOCUMENTS

| CN | 1740997 A | 3/2006 |
|---|---|---|
| CN | 102117259 A | 7/2011 |

(Continued)

OTHER PUBLICATIONS

International Search Report for PCT/CN2022/074603 dated Apr. 20, 2022.

(Continued)

*Primary Examiner* — Walter J Divito
*Assistant Examiner* — Anthony Luo
(74) *Attorney, Agent, or Firm* — DINSMORE & SHOHL LLP (57) ABSTRACT

If a resource of a PCI device needs to be designated and allocated with a fixed address range and a designated and allocated address is not within a preset address interval range, a resource address of the PCI device is merely allocated according to the designated and allocated address thereof; and when resource address information of a parent device PCI bridge of the PCI device is calculated, the resource address information of the parent device PCI bridge of the PCI device is calculated merely according to another child device, other than this PCI child device, of the parent device PCI bridge, rather than taking the designated and allocated fixed address range of the PCI device into consideration, so as to prevent a length error of a resource (Continued)

allocation address of the parent device PCI bridge resulting in a serious system error.

20 Claims, 2 Drawing Sheets

(51) Int. Cl.
    *H04L 47/78*     (2022.01)
    *H04L 47/80*     (2022.01)

(56) References Cited

U.S. PATENT DOCUMENTS

| | | | |
|---|---|---|---|
| 2020/0167247 A1* | 5/2020 | Tsirkin | G06F 11/1484 |
| 2020/0213115 A1* | 7/2020 | Mathane | G06F 21/575 |

FOREIGN PATENT DOCUMENTS

| | | | |
|---|---|---|---|
| CN | 102521195 A | 6/2012 | |
| CN | 104185978 A | 12/2014 | |
| CN | 107404350 A | 11/2017 | |
| CN | 108777634 A | 11/2018 | |
| CN | 113067912 A | 7/2021 | |
| WO | 2012163231 A1 | 6/2012 | |
| WO | 2013131725 A1 | 9/2013 | |
| WO | 2022188577 A1 | 9/2022 | |

OTHER PUBLICATIONS

English translation of International Search Report for PCT/CN2022/074603 dated Apr. 20, 2022.
Written Opinion for PCT/CN2022/07460.
English translation of Written Opinion for PCT/CN2022/07460.
First Office Action of corresponding CN application 202110265077.1.
English translation of First Office Action of corresponding CN application 202110265077.1.
Notification to Grant corresponding CN application 202110265077.1.
English translation of Notification to Grant corresponding CN application 202110265077.1.
Research of Virtualization Technology and Implementation of Direct PCI Device Access, Dalian University of Technology dated Dec. 5, 2006. (English Abstract).
First Office Action dated Nov. 24, 2022 in Corresponding Application No. 202110265077.1, 7 pages.
"Research of Virtualization Technology and Implementation of Direct PCI Device Access", Dalian University of Technology, Dec. 5, 2006, 60 pages.

* cited by examiner

FIG. 1

FIG. 2

RESOURCE ADDRESS ALLOCATION METHOD, SYSTEM AND APPARATUS FOR PCI DEVICE

CROSS-REFERENCE TO RELATED APPLICATIONS

This application is the U.S. National Stage of International Application No. PCT/CN2022/074605 filed Jan. 28, 2022, which claims priority to China Patent Application No. 202110265077.1, filed on Mar. 11, 2021 in China National Intellectual Property Administration and entitled "RESOURCE ADDRESS ALLOCATION METHOD, SYSTEM AND APPARATUS FOR PCI DEVICE", the entire contents of which are incorporated herein by reference.

FIELD

The present application relates to the field of servers, more particularly to a resource address allocation method, system and apparatus for a Peripheral Component Interconnect (PCI) device.

BACKGROUND OF THE INVENTION

A Basic Input Output System (BIOS) provides the bottom and most direct hardware settings and control for computer systems. For Peripheral Component Interconnect (PCI) devices in the system, there are two resource address allocation manners for the PCI devices in the BIOS: a fixed allocation manner and a dynamic allocation manner. The fixed allocation manner refers to allocating, by the BIOS, designated addresses for storage resources of PCI devices. The dynamic allocation manner refers to allocating, by the BIOS, addresses to storage resources of PCI devices according to a sequence of the PCI devices scanned during initialization of the system. However, the existing resource address allocation method is only applicable to a case where addresses designated and allocated to the storage resources of the PCI devices are within a preset address interval range (an address interval of a Memory mapped I/O (MMIO) region). If an address designated and allocated to a storage resource of a PCI device is not within the preset address interval range, this will cause a length error in a resource allocation address of a parent device PCI bridge (an intermediate connection device that connects the PCI device to a PCI bus) of the PCI device, resulting in a serious system error.

Therefore, how to provide a solution for the above technical problems is a problem that those skilled in the art have to solve at present.

SUMMARY OF THE INVENTION

The present application aims to provide a resource address allocation method, system and apparatus for a Peripheral Component Interconnect (PCI) device, to avoid a serious system error caused by a length error in a resource allocation address of a parent device PCI bridge of the PCI device.

In order to solve the above technical problems, the present application provides a resource address allocation method for PCI device, including:

calculating resource address information of PCI devices with no fixed resource allocation demand in a system on the basis of a dynamic allocation policy according to connection information and resource demand information of PCI bridges and the PCI devices in the system;

determining, according to a content of a preset configuration file, whether PCI devices connected to a target PCI bridge are all PCI devices with fixed resource allocation demand, wherein the preset configuration file includes resource fixed-address information of PCI devices with a fixed allocation manner, and the target PCI bridge is any one of the PCI bridges;

in a case that the PCI devices connected to the target PCI bridge are all PCI devices with fixed resource allocation demand, performing resource address allocation on a target PCI device according to the resource fixed-address information of the target PCI device, and determining whether the resource fixed-address information of the target PCI device is within a preset address interval, wherein the target PCI device is any one of the PCI devices;

in a case that the resource fixed-address information of the target PCI device is not within the preset address interval, skipping updating currently calculated resource address information of the target PCI bridge;

in a case that the resource fixed-address information of the target PCI device is within the preset address interval, updating currently calculated resource address information of the target PCI bridge according to the resource fixed-address information of the target PCI device;

obtaining final updated resource address information of the target PCI bridge after determination on the resource fixed-address information of all the PCI devices connected to the target PCI bridge is completed, and performing resource address allocation on the target PCI bridge according to the final updated resource address information of the target PCI bridge; and in a case that the PCI devices connected to the target PCI bridge do not include a PCI device with fixed resource allocation demand, recursively calculating resource address information of the target PCI bridge according to the resource address information of all the PCI devices connected to the target PCI bridge, and performing resource address allocation according to the resource address information of the target PCI bridge and the resource address information of the PCI devices connected to the target PCI bridge.

In an embodiment of the present application, the process of calculating resource address information of PCI devices with no fixed resource allocation demand in a system on the basis of a dynamic allocation policy according to connection information and resource demand information of PCI bridges and the PCI devices in the system includes:

constructing a PCI tree structure according to a connection architecture of the PCI bridges and the PCI devices in the system;

scanning the PCI bridges and the PCI devices in the PCI tree structure using a depth-first algorithm, and correspondingly writing device connection information of each traversed PCI bridge and resource demand information of each traversed PCI device into the PCI tree structure; and calculating the resource address information of the PCI devices with no fixed resource allocation demand on the basis of the dynamic allocation policy according to the resource demand information of the respective PCI devices in the PCI tree structure.

In an embodiment of the present application, the process of calculating the resource address information of the PCI devices with no fixed resource allocation demand on the basis of the dynamic allocation policy according to the resource demand information of the respective PCI devices in the PCI tree structure includes:

cyclically traversing all node devices in the PCI tree structure;

in a case that the traversed node device is a PCI device, determining, according to the resource demand information of this PCI device, whether this PCI device has a fixed resource allocation demand; and in a case that this PCI device has no fixed resource allocation demand, calculating, on the basis of the dynamic allocation policy, the resource address information meeting a requirement of the resource demand information of this PCI device, wherein the resource demand information includes a resource length and a resource type.

In an embodiment of the present application, the resource type includes a 32 bit resource and a 64 bit resource. The preset address interval includes a first address interval used for allocating 32 bit resource addresses and a second address interval used for allocating 64 bit resource addresses.

In an embodiment of the present application, the process of updating currently calculated resource address information of the target PCI bridge according to the resource fixed-address information of the target PCI device includes:

after it is determined that the resource fixed-address information of a first PCI device is within the preset address interval, taking a fixed base address in the resource fixed-address information of the first PCI device as a first base address currently corresponding to the target PCI bridge, wherein the resource fixed-address information includes a fixed base address and a resource length;

after it is determined that the resource fixed-address information of a second PCI device is within the preset address interval, taking a fixed base address in the resource fixed-address information of the second PCI device as a second base address currently corresponding to the target PCI bridge;

taking a smaller base address selected from the first base address and the second base address as a smallest base address currently corresponding to the target PCI bridge, and taking a larger base address selected from the first base address and the second base address as a largest base address currently corresponding to the target PCI bridge;

after it is successively determined that the resource fixed-address information of a target PCI device is within the preset address interval, determining whether a fixed base address in the resource fixed-address information of this target PCI device is smaller than the smallest base address or larger than the largest base address;

in a case that the fixed base address in the resource fixed-address information of this target PCI device is smaller than the smallest base address, updating the smallest base address currently corresponding to the target PCI bridge according to the fixed base address of this target PCI device; and in a case that the fixed base address in the resource fixed-address information of this target PCI device is larger than the largest base address, updating the largest base address currently corresponding to the target PCI bridge according to this target PCI device; and correspondingly, the process of obtaining final updated resource address information of the target PCI bridge after determination on the resource fixed-address information of all the PCI devices connected to the target PCI bridge is completed includes:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

In an embodiment of the present application, the resource address allocation method for PCI device further includes:

acquiring resource fixed-address information of the PCI devices with the fixed allocation manner from the configuration file, and saving the resource fixed-address information of the respective PCI devices into a fixed allocation chain table, so that the resource fixed-address information of the target PCI device may be retrieved from the fixed allocation chain table.

In order to solve the above technical problems, the present application further provides a resource address allocation system for PCI device, including:

a resource calculation module, configured to calculate resource address information of PCI devices with no fixed resource allocation demand in a system on the basis of a dynamic allocation policy according to connection information and resource demand information of PCI bridges and the PCI devices in the system;

a device determining module, configured to determine, according to a content of a preset configuration file, whether PCI devices connected to a target PCI bridge are all PCI devices with fixed resource allocation demand; execute an address determining module in a case that the PCI devices are all PCI devices with fixed resource allocation demand; execute a second allocation module in a case that the PCI devices are not all PCI devices with fixed resource allocation demand, wherein the configuration file includes resource fixed-address information of PCI devices with a fixed allocation manner, and the target PCI bridge is any one of the PCI bridges;

the address determining module, configured to perform resource address allocation on a target PCI device according to the resource fixed-address information of the target PCI device, and determine whether the resource fixed-address information of the target PCI device is within a preset address interval; skip executing an address calculation module in a case that the resource fixed-address information of the target PCI device is not within the preset address interval; execute the address calculation module in a case that the resource fixed-address information of the target PCI device is within the preset address interval, wherein the target PCI device is any one of the PCI devices;

the address calculation module, configured to update currently calculated resource address information of the target PCI bridge according to the resource fixed-address information of the target PCI device;

a first allocation module, configured to obtain final updated resource address information of the target PCI bridge after determination on the resource fixed-address information of all the PCI devices connected to the target PCI bridge is completed, and perform resource address allocation on the target PCI bridge according to the final updated resource address information of the target PCI bridge; and the second allocation module, configured to, in a case that the PCI devices connected to the target PCI bridge do not include a PCI device with fixed resource allocation demand, recursively calculate resource address information of the target PCI bridge according to the resource address information of all the PCI devices connected to the target PCI bridge, and perform resource address allocation according to the resource address information of the target PCI bridge and the resource address information of the PCI devices connected to the target PCI bridge.

In an embodiment of the present application, the resource calculation module is specifically configured to:

construct a PCI tree structure according to a connection architecture of the PCI bridges and the PCI devices in the system;

scan the PCI bridges and the PCI devices in the PCI tree structure using a depth-first algorithm, and correspondingly writing device connection information of each traversed PCI bridge and resource demand information of each traversed PCI device into the PCI tree structure; and calculate the resource address information of the PCI devices with no fixed resource allocation demand on the basis of the dynamic allocation policy according to the resource demand information of the respective PCI devices in the PCI tree structure.

In an embodiment of the present application, the address calculation module is specifically configured to:

after it is determined that the resource fixed-address information of a first PCI device is within the preset address interval, take a fixed base address in the resource fixed-address information of the first PCI device as a first base address currently corresponding to the target PCI bridge, wherein the resource fixed-address information includes a fixed base address and a resource length;

after it is determined that the resource fixed-address information of a second PCI device is within the preset address interval, take a fixed base address in the resource fixed-address information of the second PCI device as a second base address currently corresponding to the target PCI bridge;

take a smaller base address selected from the first base address and the second base address as a smallest base address currently corresponding to the target PCI bridge, and take a larger base address selected from the first base address and the second base address as a largest base address currently corresponding to the target PCI bridge;

after it is successively determined that the resource fixed-address information of a target PCI device is within the preset address interval, determine whether a fixed base address in the resource fixed-address information of this target PCI device is smaller than the smallest base address or larger than the largest base address;

in a case that the fixed base address in the resource fixed-address information of this target PCI device is smaller than the smallest base address, update the smallest base address currently corresponding to the target PCI bridge according to the fixed base address of this target PCI device; and in a case that the fixed base address in the resource fixed-address information of this target PCI device is larger than the largest base address, update the largest base address currently corresponding to the target PCI bridge according to the fixed base address of this target PCI device; and correspondingly, the process of obtaining final updated resource address information of the target PCI bridge after determination on the resource fixed-address information of all the PCI devices connected to the target PCI bridge is completed includes:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

In order to solve the above technical problems, the present application further provides a resource address allocation apparatus for PCI device, including:

a memory, configured to store a computer program; and a processor, configured to execute the computer program to implement the steps of any one of the above resource address allocation methods for PCI device.

The present application provides a resource address allocation method. If a resource of a PCI device needs to be designated and allocated with a fixed address range, and a designated and allocated address is not within a preset address interval range, a resource address of this PCI device is merely allocated according to the designated and allocated address thereof. When resource address information of a parent device PCI bridge of this PCI device is calculated, the resource address information of the parent device PCI bridge of this PCI device is calculated merely according to another child device, other than this PCI child device, of the parent device PCI bridge, without taking the designated and allocated fixed address range of the PCI device into consideration, so as to prevent a length error of a resource allocation address of the parent device PCI bridge, thereby avoiding producing a serious system error.

The present application further provides a resource address allocation system and apparatus for PCI device, which have the same beneficial effects as the beneficial effects of the above resource allocation method.

BRIEF DESCRIPTION OF DRAWINGS

In order to describe the technical solutions in the embodiments of the present application more clearly, drawings required to be used in the prior art and the embodiments will be briefly introduced below. Apparently, the drawings described below are only some embodiments of the present application. Those of ordinary skill in the art also may obtain other drawings according to these drawings without doing creative work.

DETAILED DESCRIPTION OF THE INVENTION

The key point of the present application is to provide a resource address allocation method, system and apparatus for a Peripheral Component Interconnect (PCI) device, to avoid a serious system error caused by a length error in a resource allocation address of a parent device PCI bridge of the PCI device.

In order to make the objectives, technical schemes and advantages of the embodiments of the present application clearer, the technical solutions in the embodiments of the present application will be described clearly and completely below in combination with the drawings in the embodiments of the present application. Apparently, the embodiments described are part of the embodiments of the present application, not all the embodiments. Based on the embodiments in the present application, other embodiments obtained by those of ordinary skill in the art without creative work all fall within the protection scope of the present application.

Figure 1:
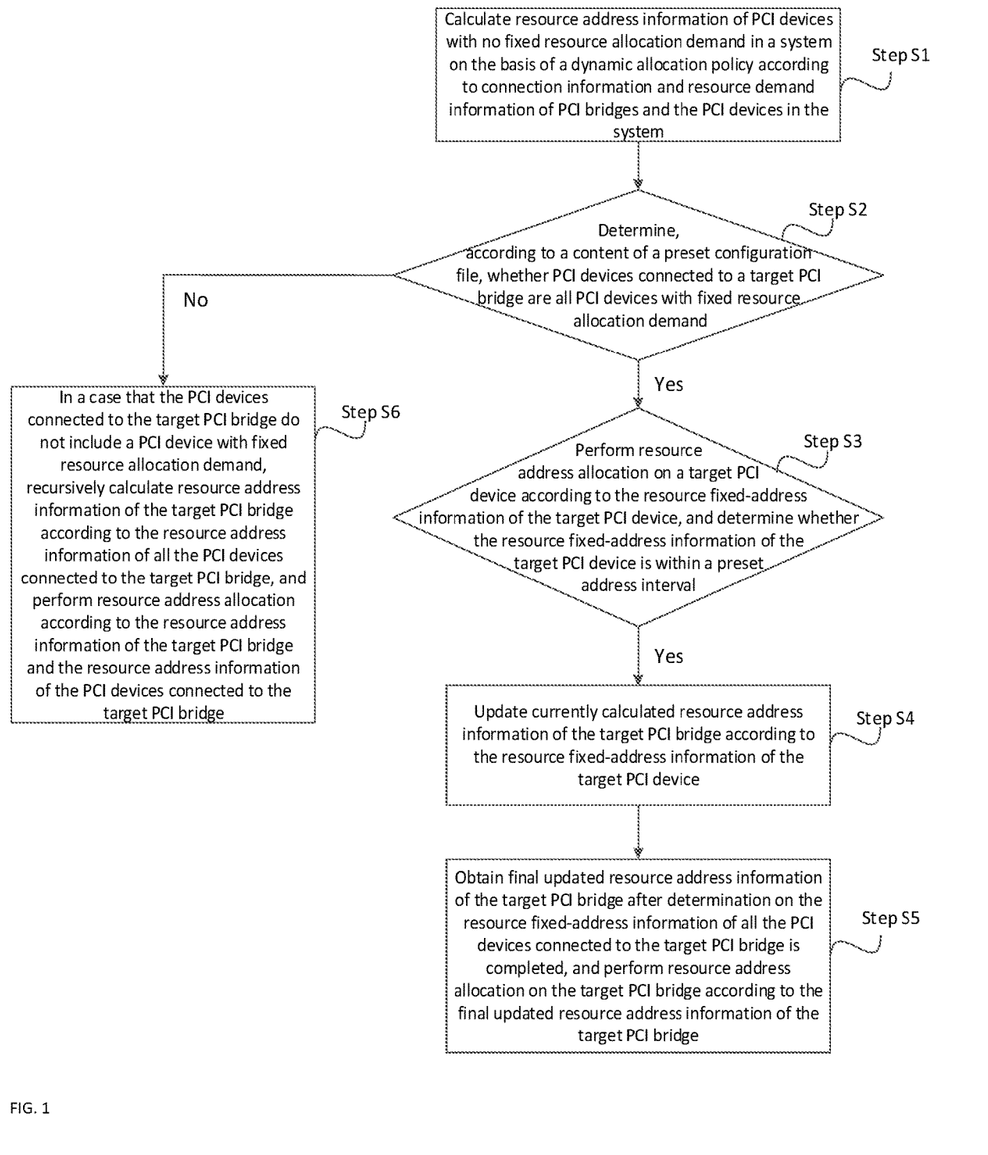
FIG. 1 is a flowchart of a resource address allocation method for PCI device provided according to an embodiment of the present application.

Referring to FIG. 1, FIG. 1 is a flowchart of a resource address allocation method for PCI device provided according to an embodiment of the present application.

The resource address allocation method for PCI device includes:

step S1: calculating resource address information of PCI devices with no fixed resource allocation demand in a system on the basis of a dynamic allocation policy according to connection information and resource demand information of PCI bridges and the PCI devices in the system;

step S2: determining, according to a content of a preset configuration file, whether PCI devices connected to a target PCI bridge are all PCI devices with fixed resource allocation demand; if yes, executing step S3; and if not, executing step S6;

step S3: performing resource address allocation on a target PCI device according to resource fixed-address information of the target PCI device; determining whether the resource fixed-address information of the target PCI device is within a preset address interval; and if yes, executing step S4;

step S4: updating currently calculated resource address information of the target PCI bridge according to the resource fixed-address information of the target PCI device;

step S5: obtaining final updated resource address information of the target PCI bridge after determination on the resource fixed-address information of all the PCI devices connected to the target PCI bridge is completed, and performing resource address allocation on the target PCI bridge according to the final updated resource address information of the target PCI bridge; and step S6: in a case that the PCI devices connected to the target PCI bridge do not include a PCI device with fixed resource allocation demand, recursively calculating resource address information of the target PCI bridge according to the resource address information of all the PCI devices connected to the target PCI bridge, and performing resource address allocation according to the resource address information of the target PCI bridge and the resource address information of the PCI devices connected to the target PCI bridge.

It should be noted that the preset configuration file includes resource fixed-address information of PCI devices with a fixed allocation manner. The target PCI bridge is any one of the PCI bridges in the system, and the target PCI device is any one of the PCI devices.

Specifically, in the present application, the resource address information of the PCI devices with no fixed resource allocation demand in the system is calculated first on the basis of the dynamic allocation policy according to the connection information and resource demand information of the PCI bridges and the PCI devices in the system.

In the present application, the resource fixed-address information of the PCI devices with the fixed allocation manner is written into the configuration file in advance, so as to determine, by using the configuration file, whether a resource address allocation manner of each PCI device in the system is actually a dynamic allocation manner or a fixed allocation manner.

The target PCI bridge is taken as an example to explain a resource address allocation principle: determining, according to the content of the preset configuration file, whether the PCI devices connected to the target PCI bridge are all PCI devices with fixed resource allocation demand; in a case that the PCI devices connected to the target PCI bridge do not include a PCI device with fixed resource allocation demand, recursively (according to the dynamic allocation policy) calculating resource address information of the target PCI bridge according to the resource address information of all the PCI devices connected to the target PCI bridge, and then performing resource address allocation on the target PCI bridge according to the calculated resource address information of the target PCI bridge. More specifically, the resource address information of the PCI devices include a base address (namely, a resource start address) and a resource length, and a resource address range of the recursively calculated PCI bridge is: [the smallest base addresses in the resource address information of the respective PCI devices connected to this PCI bridge, the largest base addresses in the resource address information of the respective PCI devices connected to this PCI bridge+the resource lengths of the PCI devices corresponding to the largest base addresses]. For example, if a PCI device A and a PCI device B are connected to a PCI bridge, a resource address range of the PCI device A is [1, 100], that is, the PCI device A has a base address being 1, and has a resource length is 100, and a resource address range of the PCI device B is [101, 200], that is, the PCI device B has a base address being 101, and a resource length being 100, a resource address range of the PCI bridge connected to the PCI device A and the PCI device B is [1, 200], that is, the PCI bridge has a base address being 1, and a resource length being 200.

In the case that the PCI devices connected to the PCI bridge are all PCI devices with a fixed allocation manner, for the target PCI bridge, if the resource fixed-address information of any one (referred to as the target PCI device) of the PCI devices connected to the target PCI bridge is not within the preset address interval, the resource address information of a parent device target PCI bridge of the target PCI device has a large span, which may cause that the system does not have an address allocatable to the target PCI bridge, that is, cause a length error in a resource allocation address of the target PCI bridge, thereby resulting in a serious system error. Therefore, in the present application, resource address allocation is first performed on the target PCI device according to the resource fixed-address information of the target PCI device. It is determined that whether the resource fixed-address information of the target PCI device is within the preset address interval. If the resource fixed-address information of the target PCI device is within the preset address interval, currently calculated resource address information of the target PCI bridge is updated according to the resource fixed-address information of the target PCI device. If the resource fixed-address information of the target PCI device is not within the preset address interval, updating currently calculated resource address information of the target PCI bridge according to the resource fixed-address information of the target PCI device is skipped, that is, updating the currently calculated resource address information of the target PCI bridge is skipped, so as to avoid a serious system error caused by a length error of a resource allocation address of the parent device PCI bridge.

It is determined whether determination (determination of whether the resource fixed-address information is within the preset address interval) on the resource fixed-address information of all the PCI devices connected to the target PCI bridge is completed. If the determination is not completed, the step of performing resource address allocation on the target PCI device according to the resource fixed-address information of the target PCI device is executed again, and it is determined whether the resource fixed-address information of the target PCI device is within the preset address interval, so as to make a determination on undetermined target PCI devices. Final updated resource address information of the target PCI bridge is obtained if the determination on all the PCI devices is completed, and resource address allocation is performed on the target PCI bridge according to the final updated resource address information of the target PCI bridge.

The present application provides a resource address allocation method. If a resource of a PCI device needs to be designated and allocated with a fixed address range, and a designated and allocated address is not within a preset address interval range, a resource address of the PCI device is merely allocated according to the designated and allocated address thereof. When resource address information of a parent device PCI bridge of the PCI device is calculated, the resource address information of the parent device PCI bridge of the PCI device is calculated merely according to another child device, other than this PCI child device, of the parent device PCI bridge, without taking the designated and allocated fixed address range of the PCI device into consideration, so as to prevent a length error of a resource allocation address of the parent device PCI bridge, thereby avoiding producing a serious system error.

Based on the above embodiment:

As an optional embodiment, the process of calculating resource address information of PCI devices with no fixed resource allocation demand in a system on the basis of a dynamic allocation policy according to connection information and resource demand information of PCI bridges and the PCI devices in the system includes:

constructing a PCI tree structure according to a connection architecture of the PCI bridges and the PCI devices in the system;

scanning the PCI bridges and the PCI devices in the PCI tree structure using a depth-first algorithm, and correspondingly writing device connection information of each traversed PCI bridge and resource demand information of each traversed PCI device into the PCI tree structure; and calculating the resource address information of the PCI devices with no fixed resource allocation demand on the basis of the dynamic allocation policy according to the resource demand information of the respective PCI devices in the PCI tree structure.

Specifically, in the present application, the PCI tree structure (Root-Bridge tree, called an rb tree for short) that represents connection relationships between the PCI bridges and the PCI devices may be constructed according to the connection architecture of the PCI bridges and the PCI devices in the system, and the depth-first algorithm is used to scan the PCI bridges and the PCI devices in the PCI tree structure. The device connection information (which represents information of connection of the PCI bridges to the PCI devices) of each traversed PCI bridge and resource demand information of each traversed PCI device is correspondingly written into the PCI tree structure. Then, the resource address information of the PCI devices with no fixed resource allocation demand is calculated on the basis of the dynamic allocation policy according to the resource demand information of the respective PCI devices in the PCI tree structure.

As an optional embodiment, the process of calculating the resource address information of the PCI devices with no fixed resource allocation demand on the basis of the dynamic allocation policy according to the resource demand information of the respective PCI devices in the PCI tree structure includes:

cyclically traversing all node devices in the PCI tree structure;

in a case that the traversed node device is a PCI device, determining, according to the resource demand information of this PCI device, whether this PCI device has a fixed resource allocation demand; and in a case that this PCI device has no fixed resource allocation demand, calculating, on the basis of the dynamic allocation policy, the resource address information meeting a requirement of the resource demand information of this PCI device, wherein the resource demand information includes a resource length and a resource type.

Specifically, in the present application, all the node devices in the PCI tree structure are cyclically traversed. In a case that the traversed node device is a PCI device, determines, it is determined whether this PCI device has a fixed resource allocation demand according to the resource demand information (the resource length and the resource type) of this PCI device. In a case that this PCI device has no fixed resource allocation demand, the resource address information meeting the requirement of the resource demand information of this PCI device (different resource types correspond to different selectable resource address ranges, and ranges of the resource address information of the PCI devices are equal to the resource lengths of the PCI devices) is calculated on the basis of the dynamic allocation policy, thereby obtaining the resource address information of the PCI devices with no fixed resource allocation demand.

As an optional embodiment, the resource type includes a 32 bit resource and a 64 bit resource. The preset address interval includes a first address interval used for allocating 32 bit resource addresses and a second address interval used for allocating 64 bit resource addresses.

Specifically, the resource type of each PCI device includes the 32 bit resource and the 64 bit resource. A selectable resource address range corresponding to the 32 bit resource is referred to as a first address interval, and a selectable resource address range corresponding to the 64 bit resource is referred to as a second address interval.

As an optional embodiment, the process of updating currently calculated resource address information of the target PCI bridge according to the resource fixed-address information of the target PCI device includes:
  after it is determined that the resource fixed-address information of a first PCI device is within the preset address interval, taking a fixed base address in the resource fixed-address information of the first PCI device as a first base address currently corresponding to the target PCI bridge, wherein the resource fixed-address information includes a fixed base address and a resource length;
  after it is determined that the resource fixed-address information of a second PCI device is within the preset address interval, taking a fixed base address in the resource fixed-address information of the second PCI device as a second base address currently corresponding to the target PCI bridge;
  taking a smaller base address selected from the first base address and the second base address as a smallest base address currently corresponding to the target PCI bridge, and taking a larger base address selected from the first base address and the second base address as a largest base address currently corresponding to the target PCI bridge;
  after it is successively determined that the resource fixed-address information of a target PCI device is within the preset address interval, determining whether a fixed base address in the resource fixed-address information of this target PCI device is smaller than the smallest base address or larger than the largest base address;
  in a case that the fixed base address in the resource fixed-address information of this target PCI device is smaller than the smallest base address, updating the smallest base address currently corresponding to the target PCI bridge according to the fixed base address of this target PCI device; and
  in a case that the fixed base address in the resource fixed-address information of this target PCI device is larger than the largest base address, updating the largest base address currently corresponding to the target PCI bridge according to the fixed base address of this target PCI device; and
  correspondingly, the process of obtaining final updated resource address information of the target PCI bridge after determination on the resource fixed-address information of all the PCI devices connected to the target PCI bridge is completed includes:
  after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

Specifically, the PCI devices connected to the target PCI bridge are all PCI devices with a fixed allocation manner. PCI devices connected to the target PCI bridge and having resource fixed-address information within the preset address interval are traversed. A fixed base address of a first traversed PCI device is taken as a first base address corresponding to the target PCI bridge. A fixed base address of a second traversed PCI device is taken as a second base address corresponding to the target PCI bridge. A smaller base address selected from the first base address and the second base address is taken as a smallest base address currently corresponding to the target PCI bridge, and a larger base address selected from the first base address and the second base address is taken as a largest base address currently corresponding to the target PCI bridge. When subsequent PCI devices having resource fixed-address information within the preset address interval are traversed, the target PCI device is taken as an example. The process of updating currently calculated resource address information of the target PCI bridge according to the resource fixed-address information of the target PCI device includes: acquiring the smallest base address and the largest base address in the currently calculated resource address information of the target PCI bridge; determining whether the fixed base address in the resource fixed-address information of the target PCI device is smaller than the smallest base address or larger than the largest base address; in a case that the fixed base address is smaller than the smallest base address, taking the fixed base address as the smallest base address currently corresponding to the target PCI bridge; in a case that the fixed base address is larger than the largest base address, taking the fixed base address as the largest base address currently corresponding to the target PCI bridge; and in a case that the fixed base address is between the smallest base address and the largest base address, skipping modifying the smallest base address and largest base address currently corresponding to the target PCI bridge. Based on this, the currently calculated resource address information (the base address+the resource length) of the target PCI bridge is specifically as follows: The base address of the target PCI bridge is the smallest base address currently corresponding to the target PCI bridge, and the resource length of the target PCI bridge is a value of (the largest base address currently corresponding to the target PCI bridge+a resource length of a PCI device corresponding to the current largest base address−the smallest base address currently corresponding to the target PCI bridge).

As one optional embodiment, the resource address allocation method for PCI device further includes:
  acquiring resource fixed-address information of the PCI devices with the fixed allocation manner from the configuration file, and saving the resource fixed-address information of the respective PCI devices into a fixed allocation chain table, so that the resource fixed-address information of the target PCI device may be retrieved from the fixed allocation chain table.

Specifically, the present application provides a base address and a resource length of a PCI device with a fixed allocation manner as resource fixed-address information of the PCI device with the fixed allocation manner, and also provides a resource type of the PCI device with the fixed allocation manner. Meanwhile, the present application provides a resource length and a resource type of a PCI device with a dynamic allocation manner for later use.

Further, the present application may also provide a fixed allocation chain table for the PCI device with the fixed allocation manner in advance, aiming at saving the resource fixed-address information of the respective PCI devices with the fixed allocation manner into the fixed allocation chain table in sequence for later acquisition.

Figure 2:
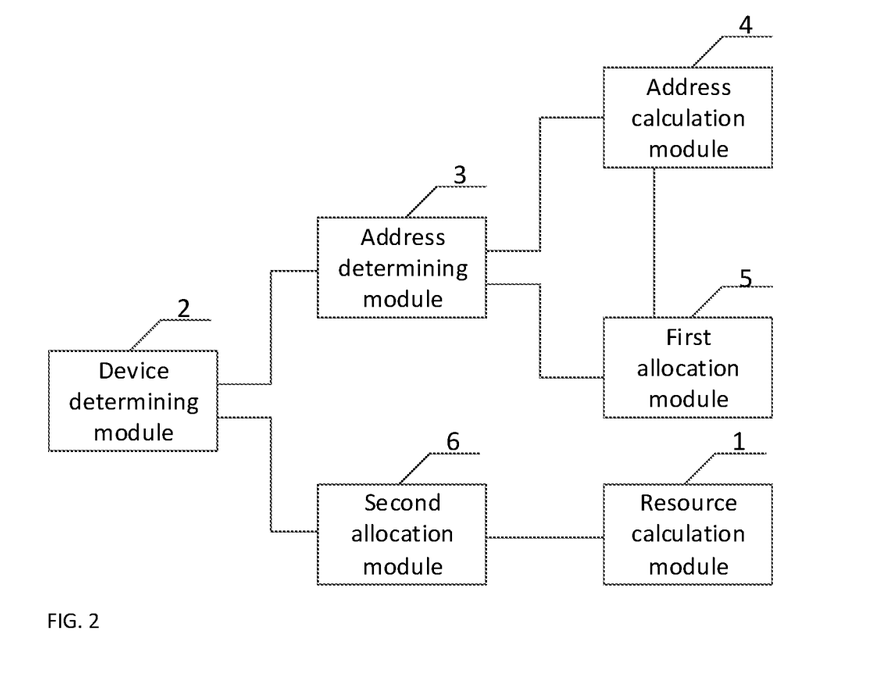
FIG. 2 is a schematic structural diagram of a resource address allocation system for PCI device provided according to an embodiment of the present application.

Referring to FIG. 2, FIG. 2 is a schematic structural diagram of a resource address allocation system for PCI device provided according to an embodiment of the present application.

The resource address allocation system for PCI device includes:
- a resource calculation module 1, configured to calculate resource address information of PCI devices with no fixed resource allocation demand in a system on the basis of a dynamic allocation policy according to connection information and resource demand information of PCI bridges and the PCI devices in the system;
- a device determining module 2, configured to determine, according to a content of a preset configuration file, whether PCI devices connected to a target PCI bridge are all PCI devices with fixed resource allocation demand; execute an address determining module 3 in a case that the PCI devices are all PCI devices with fixed resource allocation demand; execute a second allocation module 6 in a case that the PCI devices are not all PCI devices with fixed resource allocation demand, wherein the configuration file includes resource fixed-address information of PCI devices with a fixed allocation manner, and the target PCI bridge is any one of the PCI bridges;
- the address determining module 3, configured to perform resource address allocation on a target PCI device according to the resource fixed-address information of the target PCI device, and determine whether the resource fixed-address information of the target PCI device is within a preset address interval; skip executing an address calculation module 4 in a case that the resource fixed-address information of the target PCI device is not within the preset address interval; execute the address calculation module 4 in a case that the resource fixed-address information of the target PCI device is within the preset address interval, wherein the target PCI device is any one of the PCI devices;
- the address calculation module 4, configured to update currently calculated resource address information of the target PCI bridge according to the resource fixed-address information of the target PCI device;
- a first allocation module 5, configured to obtain final updated resource address information of the target PCI bridge after determination on the resource fixed-address information of all the PCI devices connected to the target PCI bridge is completed, and perform resource address allocation on the target PCI bridge according to the final updated resource address information of the target PCI bridge; and
- the second allocation module 6, configured to, in a case that the PCI devices connected to the target PCI bridge do not include a PCI device with fixed resource allocation demand, recursively calculate resource address information of the target PCI bridge according to the resource address information of all the PCI devices connected to the target PCI bridge, and perform resource address allocation according to the resource address information of the target PCI bridge and the resource address information of the PCI devices connected to the target PCI bridge.

As one optional embodiment, the resource calculation module 1 is specifically configured to:
- construct a PCI tree structure according to a connection architecture of the PCI bridges and the PCI devices in the system;
- scan the PCI bridges and the PCI devices in the PCI tree structure using a depth-first algorithm, and correspondingly write device connection information of each traversed PCI bridge and resource demand information of each traversed PCI device into the PCI tree structure; and
- calculate the resource address information of the PCI devices with no fixed resource allocation demand on the basis of the dynamic allocation policy according to the resource demand information of the respective PCI devices in the PCI tree structure.

As one optional embodiment, the address calculation module 4 is specifically configured to:
- after it is determined that the resource fixed-address information of a first PCI device is within the preset address interval, take a fixed base address in the resource fixed-address information of the first PCI device as a first base address currently corresponding to the target PCI bridge, wherein the resource fixed-address information includes a fixed base address and a resource length;
- after it is determined that the resource fixed-address information of a second PCI device is within the preset address interval, take a fixed base address in the resource fixed-address information of the second PCI device as a second base address currently corresponding to the target PCI bridge;
- take a smaller base address selected from the first base address and the second base address as a smallest base address currently corresponding to the target PCI bridge, and take a larger base address selected from the first base address and the second base address as a largest base address currently corresponding to the target PCI bridge;
- after it is successively determined that the resource fixed-address information of a target PCI device is within the preset address interval, determine whether a fixed base address in the resource fixed-address information of this target PCI device is smaller than the smallest base address or larger than the largest base address;
- in a case that the fixed base address in the resource fixed-address information of this target PCI device is smaller than the smallest base address, update the smallest base address currently corresponding to the target PCI bridge according to the fixed base address of this target PCI device; and in a case that the fixed base address in the resource fixed-address information of this target PCI device is larger than the largest base address, update the largest base address currently corresponding to the target PCI bridge according to the fixed base address of this target PCI device; and
- correspondingly, the process of obtaining final updated resource address information of the target PCI bridge after determination on the resource fixed-address information of all the PCI devices connected to the target PCI bridge is completed includes: after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

The description of the resource address allocation system provided in the present application may refer to the above embodiment of the resource address allocation method, which will not be repeated in the present application.

The present application further provides a resource address allocation apparatus for PCI device, including:
- a memory, configured to store a computer program; and
- a processor, configured to execute the computer program to implement the steps of any one of the above resource address allocation methods for PCI device.

The description of the resource address allocation apparatus provided in the present application may refer to the above embodiment of the resource address allocation method, which will not be repeated in the present application.

It should be noted that in this specification, relational terms such as first and second are used merely to distinguish one entity or operation from another entity or operation, instead of necessarily requiring or implying that these entities or operations have any such actual relationship or order. Furthermore, terms "include", "comprise" or any other variants are meant to cover non-exclusive inclusions, so that a process, method, object or device that includes a series of elements not only includes those elements, but also includes other elements which are not definitely listed, or further includes inherent elements of this process, method, object or device. Without further restrictions, elements defined by a sentence "include a/an" do not exclude that the process, method, object or device that includes the elements still includes other identical elements.

The foregoing description of the disclosed embodiments enables those skilled in the art to implement or use the present application. Various modifications to these embodiments will be apparent to those skilled in the art, and the general principles defined herein may be implemented in other embodiments without departing from the spirit or scope of the present application. Therefore, the present application will not be limited to these embodiments shown herein, but should conform to the widest scope consistent with the principles and novel features disclosed herein.

The invention claimed is:

1. A resource address allocation method for Peripheral Component Interconnect (PCI) device, comprising:
   - calculating resource address information of PCI devices with no fixed resource allocation demand in a system on the basis of a dynamic allocation policy according to connection information and resource demand information of PCI bridges and the PCI devices in the system;
   - determining, according to a content of a preset configuration file, whether PCI devices connected to a target PCI bridge are all PCI devices with fixed resource allocation demand, wherein the preset configuration file comprises resource fixed-address information of PCI devices with a fixed allocation manner, and the target PCI bridge is any one of the PCI bridges;
   - in a case that the PCI devices connected to the target PCI bridge are all PCI devices with fixed resource allocation demand, performing resource address allocation on a target PCI device according to the resource fixed-address information of the target PCI device, and determining whether the resource fixed-address information of the target PCI device is within a preset address interval, wherein the target PCI device is any one of the PCI devices;
   - in a case that the resource fixed-address information of the target PCI device is not within the preset address interval, skipping updating currently calculated resource address information of the target PCI bridge;
   - in a case that the resource fixed-address information of the target PCI device is within the preset address interval, updating currently calculated resource address information of the target PCI bridge according to the resource fixed-address information of the target PCI device;
   - obtaining final updated resource address information of the target PCI bridge after determination on the resource fixed-address information of all the PCI devices connected to the target PCI bridge is completed, and performing resource address allocation on the target PCI bridge according to the final updated resource address information of the target PCI bridge; and
   - in a case that the PCI devices connected to the target PCI bridge do not include a PCI device with fixed resource allocation demand, recursively calculating resource address information of the target PCI bridge according to the resource address information of all the PCI devices connected to the target PCI bridge, and performing resource address allocation according to the resource address information of the target PCI bridge and the resource address information of the PCI devices connected to the target PCI bridge.

2. The resource address allocation method for PCI device according to claim 1, wherein the process of calculating resource address information of PCI devices with no fixed resource allocation demand in a system on the basis of a dynamic allocation policy according to connection information and resource demand information of PCI bridges and the PCI devices in the system comprises:
   - constructing a PCI tree structure according to a connection architecture of the PCI bridges and the PCI devices in the system;
   - scanning the PCI bridges and the PCI devices in the PCI tree structure using a depth-first algorithm, and correspondingly writing device connection information of each traversed PCI bridge and resource demand information of each traversed PCI device into the PCI tree structure; and
   - calculating the resource address information of the PCI devices with no fixed resource allocation demand on the basis of the dynamic allocation policy according to the resource demand information of the respective PCI devices in the PCI tree structure.

3. The resource address allocation method for PCI device according to claim 2, wherein the process of calculating the resource address information of the PCI devices with no fixed resource allocation demand on the basis of the dynamic allocation policy according to the resource demand information of the respective PCI devices in the PCI tree structure comprises:
   - cyclically traversing all node devices in the PCI tree structure;
   - in a case that the traversed node device is a PCI device, determining, according to the resource demand information of this PCI device, whether this PCI device has a fixed resource allocation demand; and in a case that this PCI device has no fixed resource allocation demand, calculating, on the basis of the dynamic allocation policy, the resource address information meeting a requirement of the resource demand information of this PCI device, wherein the resource demand information comprises a resource length and a resource type.

4. The resource address allocation method for PCI device according to claim 3, wherein the resource type comprises a 32 bit resource and a 64 bit resource; the preset address interval comprises a first address interval used for allocating 32 bit resource addresses and a second address interval used for allocating 64 bit resource addresses.

5. The resource address allocation method for PCI device according to claim 4, wherein the process of updating currently calculated resource address information of the target PCI bridge according to the resource fixed-address information of the target PCI device comprises:

after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;

after it is determined that the resource fixed-address information of a second PCI device is within the preset address interval, taking a fixed base address in the resource fixed-address information of the second PCI device as a second base address currently corresponding to the target PCI bridge;

taking a smaller base address selected from the first base address and the second base address as a smallest base address currently corresponding to the target PCI bridge, and taking a larger base address selected from the first base address and the second base address as a largest base address currently corresponding to the target PCI bridge;

after it is successively determined that the resource fixed-address information of a target PCI device is within the preset address interval, determining whether a fixed base address in the resource fixed-address information of this target PCI device is smaller than the smallest base address or larger than the largest base address;

in a case that the fixed base address in the resource fixed-address information of this target PCI device is smaller than the smallest base address, updating the smallest base address currently corresponding to the target PCI bridge according to the fixed base address of this target PCI device; and in a case that the fixed base address in the resource fixed-address information of this target PCI device is larger than the largest base address, updating the largest base address currently corresponding to the target PCI bridge according to the fixed base address of this target PCI device; and correspondingly, the process of obtaining final updated resource address information of the target PCI bridge after determination on the resource fixed-address information of all the PCI devices connected to the target PCI bridge is completed comprises:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

6. The resource address allocation method for PCI device according to claim 5, further comprising:

acquiring resource fixed-address information of the PCI devices with the fixed allocation manner from the preset configuration file, and saving the resource fixed-address information of the respective PCI devices into a fixed allocation chain table, so that the resource fixed-address information of the target PCI device can be retrieved from the fixed allocation chain table.

7. The resource address allocation method for PCI device according to claim 2, wherein the process of updating currently calculated resource address information of the target PCI bridge according to the resource fixed-address information of the target PCI device comprises:

after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;

after it is determined that the resource fixed-address information of a second PCI device is within the preset address interval, taking a fixed base address in the resource fixed-address information of the second PCI device as a second base address currently corresponding to the target PCI bridge;

taking a smaller base address selected from the first base address and the second base address as a smallest base address currently corresponding to the target PCI bridge, and taking a larger base address selected from the first base address and the second base address as a largest base address currently corresponding to the target PCI bridge;

after it is successively determined that the resource fixed-address information of a target PCI device is within the preset address interval, determining whether a fixed base address in the resource fixed-address information of this target PCI device is smaller than the smallest base address or larger than the largest base address;

in a case that the fixed base address in the resource fixed-address information of this target PCI device is smaller than the smallest base address, updating the smallest base address currently corresponding to the target PCI bridge according to the fixed base address of this target PCI device; and in a case that the fixed base address in the resource fixed-address information of this target PCI device is larger than the largest base address, updating the largest base address currently corresponding to the target PCI bridge according to the fixed base address of this target PCI device; and correspondingly, the process of obtaining final updated resource address information of the target PCI bridge after determination on the resource fixed-address information of all the PCI devices connected to the target PCI bridge is completed comprises:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address–the smallest base address currently corresponding to the target PCI bridge) as a resource length of the target PCI bridge, so as to obtain the final updated resource address information of the target PCI bridge.

8. The resource address allocation method for PCI device according to claim 7, further comprising:
acquiring resource fixed-address information of the PCI devices with the fixed allocation manner from the preset configuration file, and saving the resource fixed-address information of the respective PCI devices into a fixed allocation chain table, so that the resource fixed-address information of the target PCI device can be retrieved from the fixed allocation chain table.

9. The resource address allocation method for PCI device according to claim 3, wherein the process of updating currently calculated resource address information of the target PCI bridge according to the resource fixed-address information of the target PCI device comprises:
after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;
after it is determined that the resource fixed-address information of a second PCI device is within the preset address interval, taking a fixed base address in the resource fixed-address information of the second PCI device as a second base address currently corresponding to the target PCI bridge;
taking a smaller base address selected from the first base address and the second base address as a smallest base address currently corresponding to the target PCI bridge, and taking a larger base address selected from the first base address and the second base address as a largest base address currently corresponding to the target PCI bridge;
after it is successively determined that the resource fixed-address information of a target PCI device is within the preset address interval, determining whether a fixed base address in the resource fixed-address information of this target PCI device is smaller than the smallest base address or larger than the largest base address;
in a case that the fixed base address in the resource fixed-address information of this target PCI device is smaller than the smallest base address, updating the smallest base address currently corresponding to the target PCI bridge according to the fixed base address of this target PCI device; and
in a case that the fixed base address in the resource fixed-address information of this target PCI device is larger than the largest base address, updating the largest base address currently corresponding to the target PCI bridge according to the fixed base address of this target PCI device; and
correspondingly, the process of obtaining final updated resource address information of the target PCI bridge after determination on the resource fixed-address information of all the PCI devices connected to the target PCI bridge is completed comprises:
after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address–the smallest base address currently corresponding to the target PCI bridge) as a resource length of the target PCI bridge, so as to obtain the final updated resource address information of the target PCI bridge.

10. The resource address allocation method for PCI device according to claim 9, further comprising:
acquiring resource fixed-address information of the PCI devices with the fixed allocation manner from the preset configuration file, and saving the resource fixed-address information of the respective PCI devices into a fixed allocation chain table, so that the resource fixed-address information of the target PCI device can be retrieved from the fixed allocation chain table.

11. The resource address allocation method for PCI device according to claim 1, wherein the process of updating currently calculated resource address information of the target PCI bridge according to the resource fixed-address information of the target PCI device comprises:
after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;
after it is determined that the resource fixed-address information of a second PCI device is within the preset address interval, taking a fixed base address in the resource fixed-address information of the second PCI device as a second base address currently corresponding to the target PCI bridge;
taking a smaller base address selected from the first base address and the second base address as a smallest base address currently corresponding to the target PCI bridge, and taking a larger base address selected from the first base address and the second base address as a largest base address currently corresponding to the target PCI bridge;
after it is successively determined that the resource fixed-address information of a target PCI device is within the preset address interval, determining whether a fixed base address in the resource fixed-address information of this target PCI device is smaller than the smallest base address or larger than the largest base address;
in a case that the fixed base address in the resource fixed-address information of this target PCI device is smaller than the smallest base address, updating the smallest base address currently corresponding to the target PCI bridge according to the fixed base address of this target PCI device; and
in a case that the fixed base address in the resource fixed-address information of this target PCI device is larger than the largest base address, updating the largest base address currently corresponding to the target PCI bridge according to the fixed base address of this target PCI device; and
correspondingly, the process of obtaining final updated resource address information of the target PCI bridge after determination on the resource fixed-address information of all the PCI devices connected to the target PCI bridge is completed comprises:
after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

12. The resource address allocation method for PCI device according to claim 11, further comprising:
acquiring resource fixed-address information of the PCI devices with the fixed allocation manner from the preset configuration file, and saving the resource fixed-address information of the respective PCI devices into a fixed allocation chain table, so that the resource fixed-address information of the target PCI device can be retrieved from the fixed allocation chain table.

13. A resource address allocation apparatus for PCI device, comprising:
a memory, configured to store a computer program; and
a processor, configured to execute the computer program to implement steps of a resource address allocation method for PCI device, wherein the steps of the resource address allocation method for PCI device comprise:
calculating resource address information of PCI devices with no fixed resource allocation demand in a system on the basis of a dynamic allocation policy according to connection information and resource demand information of PCI bridges and the PCI devices in the system;
determining, according to a content of a preset configuration file, whether PCI devices connected to a target PCI bridge are all PCI devices with fixed resource allocation demand, wherein the preset configuration file comprises resource fixed-address information of PCI devices with a fixed allocation manner, and the target PCI bridge is any one of the PCI bridges;
in a case that the PCI devices connected to the target PCI bridge are all PCI devices with fixed resource allocation demand, performing resource address allocation on a target PCI device according to the resource fixed-address information of the target PCI device, and determining whether the resource fixed-address information of the target PCI device is within a preset address interval, wherein the target PCI device is any one of the PCI devices;
in a case that the resource fixed-address information of the target PCI device is not within the preset address interval, skipping updating currently calculated resource address information of the target PCI bridge;
in a case that the resource fixed-address information of the target PCI device is within the preset address interval, updating currently calculated resource address information of the target PCI bridge according to the resource fixed-address information of the target PCI device;
obtaining final updated resource address information of the target PCI bridge after determination on the resource fixed-address information of all the PCI devices connected to the target PCI bridge is completed, and performing resource address allocation on the target PCI bridge according to the final updated resource address information of the target PCI bridge; and
in a case that the PCI devices connected to the target PCI bridge do not include a PCI device with fixed resource allocation demand, recursively calculating resource address information of the target PCI bridge according to the resource address information of all the PCI devices connected to the target PCI bridge, and performing resource address allocation according to the resource address information of the target PCI bridge and the resource address information of the PCI devices connected to the target PCI bridge.

14. The resource address allocation apparatus for PCI device according to claim 13, wherein the process of calculating resource address information of PCI devices with no fixed resource allocation demand in a system on the basis of a dynamic allocation policy according to connection information and resource demand information of PCI bridges and the PCI devices in the system comprises:
constructing a PCI tree structure according to a connection architecture of the PCI bridges and the PCI devices in the system;
scanning the PCI bridges and the PCI devices in the PCI tree structure using a depth-first algorithm, and correspondingly writing device connection information of each traversed PCI bridge and resource demand information of each traversed PCI device into the PCI tree structure; and
calculating the resource address information of the PCI devices with no fixed resource allocation demand on the basis of the dynamic allocation policy according to the resource demand information of the respective PCI devices in the PCI tree structure.

15. The resource address allocation apparatus for PCI device according to claim 14, wherein the process of updating currently calculated resource address information of the target PCI bridge according to the resource fixed-address information of the target PCI device comprises:
after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;
after it is determined that the resource fixed-address information of a second PCI device is within the preset address interval, taking a fixed base address in the resource fixed-address information of the second PCI device as a second base address currently corresponding to the target PCI bridge;
taking a smaller base address selected from the first base address and the second base address as a smallest base address currently corresponding to the target PCI bridge, and taking a larger base address selected from the first base address and the second base address as a largest base address currently corresponding to the target PCI bridge;
after it is successively determined that the resource fixed-address information of a target PCI device is within the preset address interval, determining whether a fixed base address in the resource fixed-address information of this target PCI device is smaller than the smallest base address or larger than the largest base address;

in a case that the fixed base address in the resource fixed-address information of this target PCI device is smaller than the smallest base address, updating the smallest base address currently corresponding to the target PCI bridge according to the fixed base address of this target PCI device; and in a case that the fixed base address in the resource fixed-address information of this target PCI device is larger than the largest base address, updating the largest base address currently corresponding to the target PCI bridge according to the fixed base address of this target PCI device; and correspondingly, the process of obtaining final updated resource address information of the target PCI bridge after determination on the resource fixed-address information of all the PCI devices connected to the target PCI bridge is completed comprises:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

16. The resource address allocation apparatus for PCI device according to claim 14, wherein the process of calculating the resource address information of the PCI devices with no fixed resource allocation demand on the basis of the dynamic allocation policy according to the resource demand information of the respective PCI devices in the PCI tree structure comprises:

cyclically traversing all node devices in the PCI tree structure;

in a case that the traversed node device is a PCI device, determining, according to the resource demand information of this PCI device, whether this PCI device has a fixed resource allocation demand; and in a case that this PCI device has no fixed resource allocation demand, calculating, on the basis of the dynamic allocation policy, the resource address information meeting a requirement of the resource demand information of this PCI device, wherein the resource demand information comprises a resource length and a resource type.

17. The resource address allocation apparatus for PCI device according to claim 16, wherein the resource type comprises a 32 bit resource and a 64 bit resource; the preset address interval comprises a first address interval used for allocating 32 bit resource addresses and a second address interval used for allocating 64 bit resource addresses.

18. The resource address allocation apparatus for PCI device according to claim 16, wherein the process of updating currently calculated resource address information of the target PCI bridge according to the resource fixed-address information of the target PCI device comprises:

after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;

after it is determined that the resource fixed-address information of a second PCI device is within the preset address interval, taking a fixed base address in the resource fixed-address information of the second PCI device as a second base address currently corresponding to the target PCI bridge;

taking a smaller base address selected from the first base address and the second base address as a smallest base address currently corresponding to the target PCI bridge, and taking a larger base address selected from the first base address and the second base address as a largest base address currently corresponding to the target PCI bridge;

after it is successively determined that the resource fixed-address information of a target PCI device is within the preset address interval, determining whether a fixed base address in the resource fixed-address information of this target PCI device is smaller than the smallest base address or larger than the largest base address;

in a case that the fixed base address in the resource fixed-address information of this target PCI device is smaller than the smallest base address, updating the smallest base address currently corresponding to the target PCI bridge according to the fixed base address of this target PCI device; and in a case that the fixed base address in the resource fixed-address information of this target PCI device is larger than the largest base address, updating the largest base address currently corresponding to the target PCI bridge according to the fixed base address of this target PCI device; and correspondingly, the process of obtaining final updated resource address information of the target PCI bridge after determination on the resource fixed-address information of all the PCI devices connected to the target PCI bridge is completed comprises:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

19. The resource address allocation apparatus for PCI device according to claim 13, wherein the process of updating currently calculated resource address information of the target PCI bridge according to the resource fixed-address information of the target PCI device comprises:

after it is determined that the resource fixed-address information of a first PCI device is within the preset address interval, taking a fixed base address in the resource fixed-address information of the first PCI device as a first base address currently corresponding to the target PCI bridge, wherein the resource fixed-address information comprises a fixed base address and a resource length;

after it is determined that the resource fixed-address information of a second PCI device is within the preset address interval, taking a fixed base address in the resource fixed-address information of the second PCI device as a second base address currently corresponding to the target PCI bridge;

taking a smaller base address selected from the first base address and the second base address as a smallest base address currently corresponding to the target PCI bridge, and taking a larger base address selected from the first base address and the second base address as a largest base address currently corresponding to the target PCI bridge;

after it is successively determined that the resource fixed-address information of a target PCI device is within the preset address interval, determining whether a fixed base address in the resource fixed-address information of this target PCI device is smaller than the smallest base address or larger than the largest base address;

in a case that the fixed base address in the resource fixed-address information of this target PCI device is smaller than the smallest base address, updating the smallest base address currently corresponding to the target PCI bridge according to the fixed base address of this target PCI device; and in a case that the fixed base address in the resource fixed-address information of this target PCI device is larger than the largest base address, updating the largest base address currently corresponding to the target PCI bridge according to the fixed base address of this target PCI device; and correspondingly, the process of obtaining final updated resource address information of the target PCI bridge after determination on the resource fixed-address information of all the PCI devices connected to the target PCI bridge is completed comprises:

after the determination on the resource fixed-address information of all the PCI devices connected to the target PCI bridge is completed, taking the smallest base address currently corresponding to the target PCI bridge as a base address of the target PCI bridge, and taking a value of (the largest base address currently corresponding to the target PCI bridge+a resource length of a PCI device corresponding to the current largest base address−the smallest base address currently corresponding to the target PCI bridge) as a resource length of the target PCI bridge, so as to obtain the final updated resource address information of the target PCI bridge.

20. The resource address allocation apparatus for PCI device according to claim 19, further comprising:

acquiring resource fixed-address information of the PCI devices with the fixed allocation manner from the preset configuration file, and saving the resource fixed-address information of the respective PCI devices into a fixed allocation chain table, so that the resource fixed-address information of the target PCI device can be retrieved from the fixed allocation chain table.

* * * * *